United States Patent [19]

Van Zeeland

[11] 4,216,515

[45] Aug. 5, 1980

[54] GROUND FAULT INTERRUPTER

[75] Inventor: Donald L. Van Zeeland, Franklin, Wis.

[73] Assignee: Eaton Corporation, Cleveland, Ohio

[21] Appl. No.: 345,731

[22] Filed: Mar. 28, 1973

[51] Int. Cl.² ............................................. H02H 3/28
[52] U.S. Cl. ........................................ 361/45; 361/46
[58] Field of Search ............... 317/18 D, 27 R, 33 R, 317/33 SC, 52; 330/69, 199; 361/44–48

[56] References Cited

U.S. PATENT DOCUMENTS

| | | | |
|---|---|---|---|
| 3,555,359 | 1/1971 | Morris | 317/18 D |
| 3,700,967 | 10/1972 | Hoss | 317/18 D |
| 3,736,468 | 5/1973 | Reeves et al. | 317/18 D |
| 3,787,709 | 1/1974 | Coe | 317/18 D |
| 3,852,642 | 12/1974 | Engel et al. | 317/18 D |

Primary Examiner—Patrick R. Salce

Attorney, Agent, or Firm—Hugh R. Rather; William A. Autio; Robert J. McCloskey

[57] ABSTRACT

A ground fault interrupter for two and three wire, single phase load circuits employing a circuit breaker having an electro-responsive contact trip-open mechanism, a fault sensing differential transformer, an operational amplifier providing characteristic output pulses whose magnitude depends upon the non-presence or presence of a ground fault and whether the latter is resistive or reactive in kind, and an energizing circuit for the electro-responsive contact trip-open mechanism including a transistor which is normally held non-conducting in the absence of a ground fault and rendered conducting whenever a resistive ground fault occurs. A capacitor in circuit with the amplifier output and transistor base renders the transistor immune from amplifier pulses characteristic of reactive ground faults. Varistors are included between the load circuit wires to suppress transient voltage surges from falsely inducing nuisance ground fault interrupting action.

10 Claims, 10 Drawing Figures

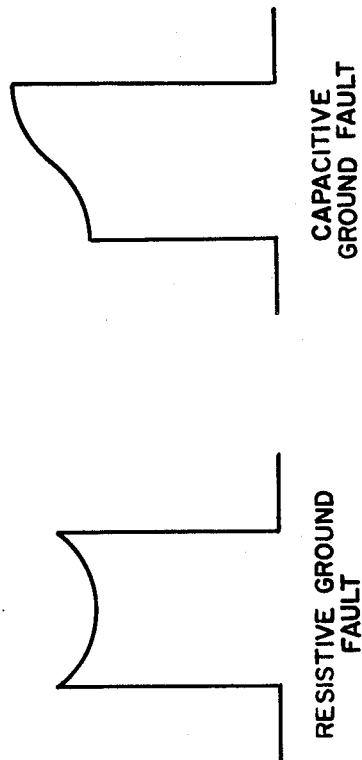
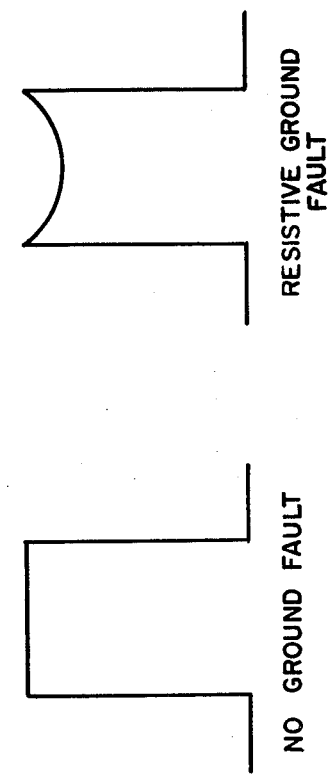

GROUND FAULT INTERRUPTER

BACKGROUND OF THE INVENTION

The present invention relates to ground fault interrupters which are sensitive to low-level resistive ground faults, but insensitive to reactive type ground faults which can occur because of load circuit capacitance or the like.

Ground fault interrupters as practically used in branch A.C. load circuits usually employ fault sensing differential transformers, amplifying means, a circuit breaker, and means respective to the amplifying circuit output to energize the circuit breaker when ground fault currents occur. Because electrical codes require that these interrupters respond to low level fault currents, nuisance tripping because of electrical noise and circuit capacitance often occurs.

OBJECTS OF THE INVENTION

It is a primary object of the present invention to provide an improved ground fault interrupter which is insensitive to reactive ground faults, but sensitive to low level resistive type ground faults.

Another object is to provide a ground fault interrupter of the aforementioned type which is rendered unresponsive to short duration high voltage transients that occur in the protected circuit, and a Still further object of the invention is to provide a ground fault interrupter which is positive and sure in operation when a resistive ground fault in excess of a threshhold value occurs.

Other objects and advantages of the invention will hereinafer appear.

BRIEF DESCRIPTION OF THE DRAWINGS

FIGS. 2a, 2b and 2c depict output pulses occurring at a point in the interrupter of FIG. 1 for different no-fault and fault conditions.

FIGS. 4a, 4b, 4c, 4d and 4e depict output pulses occurring at a point in the interrupter of FIG. 3 for no fault and different types of fault conditions.

FIG. 1 shows the improved ground fault interrupter as applied to a usual two-wire, grounded neutral alternating current distribution circuits found in and around homes and commercial establishments. As shown such circuits have two conductors of lines designated L1 and N. Line N, designated the "neutral" wire, has connection to earth ground and line L1 carries an alternating voltage with respect to line N and is termed the "electrified" wire. The lines L1 and N may be assumed to be connected at their right hand ends to a load, or to several loads connected thereacross in parallel.

Figure 1:
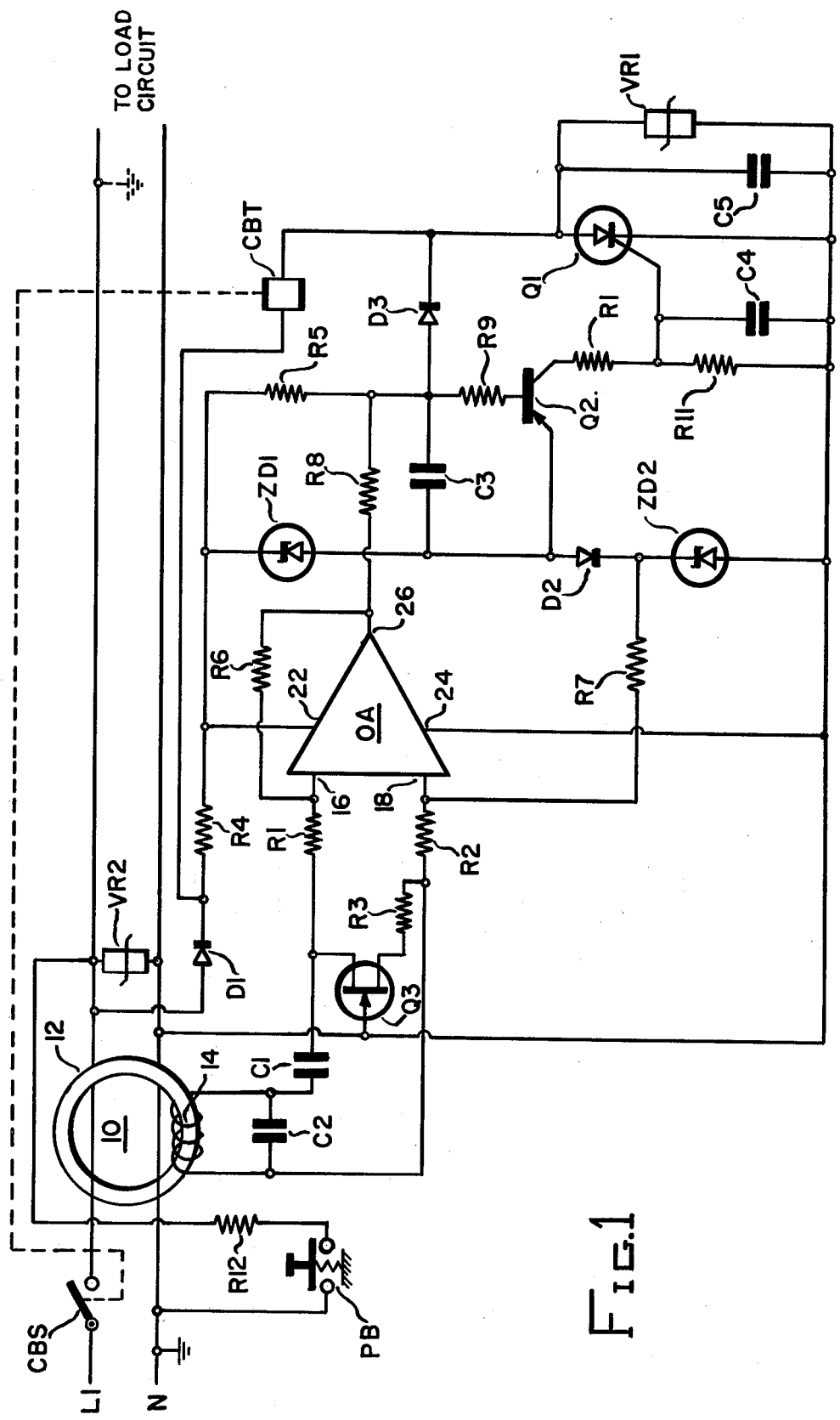
FIG. 1 is a diagramatic showing of a ground fault interrupter incorporating invention as applied to a two wire load circuit.

The ground fault interrupter comprises a circuit breaker switch CBS connected to line L1, a ground fault sensing differential transformer 10, a circuit breaker trip solenoid CBT, and an electrical network between transformer 10 and solenoid CBT. As will hereinafter be described transformer 10 and it associated electrical network respond upon occurence of a fault between line L1 and ground to effect energization of solenoid CBT which then responds to open switch CBS through mechanical connection represented by the broken line therebetween. Switch CBS may be assumed to be manually operable in the absence of such a fault.

Differential transformer 10 has a magnetic core 12 through which pass the lines L1 and N which in effect provide separate, single-turn primary windings. A multi-turn secondary winding 14 is wound on core 12 providing an output potential in a well-known manner whenever currents flowing in lines L1 and N are unbalanced. Under normal conditions, with no fault occurring between line L1 and ground, the same current will flow through lines L1 and N in opposite directions. Accordingly, not net ampere turns will be developed in secondary winding 14 and no potential will occur across the ends of this output winding.

The electrical network between secondary winding 14 of differential transformer 10 and circuit breaker trip solenoid CBT comprises an operational amplifier OA, a silicon controlled rectifier (SCR) Q1 which when rendered conducting affords energization of CBT, and a transistor Q2 which when rendered conducting triggers SCR Q1 into conduction. Amplifier OA has its inverting signal input terminal 16 connected to the right hand end of secondary winding 14 in series with a resistor R1 and a capacitor C1. The non-inverting signal input terminal 18 of the amplifier is connected in series with a resistor R2 to the left hand terminal of winding 14.

A capacitor C2 of appropriate value is connected across the terminals of winding 14 to effectively tune-out any inductive effect at the line frequency that might otherwise be imposed at the signal input terminals 16 and 18 of amplifier OA. A field effect transistor Q3 has its drain terminal connected to the point common to resistor R1 and capacitor C1. Transistor Q3 also has its source terminal connected in series with a resistor R3 to the point common between capacitor C2 and resistor R2, and its gate terminal connected to a conductor 20 that has connection to ground.

Rectified DC for the electrical network is provided by a half wave rectifier diode D1 which has its anode connected to Line L1. Its cathode in one branch is connected in series with solenoid CBT and the main conducting path of SCR Q1 to conductor 20. The cathode of diode D1 is also connected in series with a resistor R4 to the positive DC bias terminal 22 of amplifier OA, the cathode of a zener diode ZD1 and the upper terminal of a resistor R5.

The negative DC bias terminal 24 of amplifier OA is connected to ground through conductor 20. A feed back resistor R6 is connected between output signal termianl 26 of amplifier OA and inverting signal input terminal 16.

Another feed back resistor R7 is connected between the non-inverting signal input terminal 18 and the point common between a diode D2 and a second zener diode ZD2 that are connected in series between the anode of zener diode ZD1 and ground return conductor 20. The output terminal 26 of amplifier OA is connected in series with a resistor R8 to the lower end of resistor R5 and the upper end of a resistor R9 that is connected at the lower end to the base of transistor Q2. Transistor Q2 has its emitter connected to the point common between zener diode ZD1 and diode D2. The collector of Q2 is connected in series with a resistor R10 to the gate electrode of SCR Q1 which also has connection through a resistor R11 to ground return conductor 20.

The gate of SCR Q1 is also connected in series with parallel connected resistor R11 and a capacitor C4 to ground return conductor 20. A capacitor C5 and a parallel connected varistor VR1 are connected from the anode of SCR Q1 to conductor 20. Capacitor C4 provides transient suppression for the gate of Q1 and capacitor C5 provides well known dv/dt suppression to eliminate unwanted firing of Q1 due to the rapid rise of anode potential. Varistor VR1 provides transient surge protection for Q1, and the varistor VR2 provides for transient voltage surge protection to the load circuits to which the ground fault interrupter is connected, and also prevents inducement of false ground faults.

A capacitor C3 is connected at its left hand terminal to the point common between the anodes of diode D2 and zener diode ZD1 and the emitter of Q2, and at its right hand terminal to the point common between the anode of diode D3 and resistors R5, R8 and R9. As will hereinafter be more fully explained capacitor C3 is an integrating capacitor and acts to prevent undesired lowering of the potential of the base of transistor Q2 relative to that of its emitter when reactive ground faults occur.

During alternate half cycles of current flow in lines L1 and N when the potential at L1 is positive with respect to N, the potential imposed at bias terminal 22 may be assumed to obtain a 20 volt peak while the potential at the point common between resistor R7, diode D2 and zener diode ZD2 will be approximately 10 volts peak. Now with no difference in potential between the signal input terminals 16 and 18 of amplifier OA, as occurs when no ground fault is present between line L1 and ground, then amplifier OA operates in a follower mode to provide an output pulse at terminal 26 that has a potential of 10 volts relative to ground. The output pulse occurs each time in the AC wave when conductor L1 is positive with respect to line N. On the opposite half cycles there is no output at terminal 26 of amplifier OA.

Thus when no ground fault is occurring capacitor C3 at its right hand plate is subjected to a potential of approximately 12 volts due to the action of R5 and R8 and at its left hand plate is subjected to a potential approximately 11 volts. Accordingly the bias on the base of transistor Q2 will be higher than that applied to its emitter and Q2 is thus prevented from conducting. This in turn prevents conduction of the SCR Q1.

Now let it be assumed that a resistive ground fault occurs between line L1 and ground as shown by phantom lines. When this occurs more current flows through the portion of conductor L1 than passes through core 12 of transformer than through the corresponding portion of conductor N. With this unbalance in current net ampere turns are developed in secondary winding 14 which causes a potential difference to occur between the signal input terminals 16 and 18 of amplifier OA. When this occurs the voltage output pulse at terminal 26 will take the form like that depicted in FIG. 2(b). Thus the potential at the base of transistor Q2 and the right hand plate of capacitor C3 will correspondingly follow this change in average potential. Accordingly the potential of the base of transistor Q2 will decrease sufficiently below that of its emitter and thereby cause conduction of Q2.

When transistor Q2 conducts current will flow from its emitter through its collector and resistor R10 into the gate of SCR Q1 to trigger the latter into conduction. Conduction of SCR Q1 results in energization of solenoid CBT which responds to trip open circuit breaker switch CBS to disconnect the load circuit from the power line. Now when SCR Q1 conducts current will also flow through diode D3 and Q1 to ground. This effects "latching" of the base of Q2 to slightly above ground potential to insure that transistor Q2 will be rendered fully conducting, and remain conducting, even though the ground fault initiating its conduction is only of short duration. A ground fault protector built in accordance with the present invention will respond to resistive ground fault currents of 5 milliamperes or greater.

It is a feature of the present invention that it is immune to minor or phantom ground faults which occur due to capacitive or inductive effects. Let it be assumed that a phantom ground fault occurs due to capacitive effects between L1 and ground. Now the ground fault current flow will be in quadrature with a resistive ground fault current, and will normally be 90° leading. The differential transformer 10 will sense such ground fault current, and cause amplifier OA to have an output pulse such as depicted in FIG. 2(c). It will be seen in comparing this pulse with that of FIG. 2(a) that its average value is the same, although for half the pulse duration it is less and for the other half more. Capacitor C3 integrates the voltage pulse so that the base of transistor Q2 will not decrease to a value with respect to that of its emitter as will render the transistor conducting. Consequently, conduction of SCR Q1 and energization of solenoid CBT is prevented.

The presence of capacitor C1 in the signal input connections to amplifier OA minimizes the effects of any D.C. component on the output of the amplifier due to the amplifier input off-set voltage and this allows it to be used with a high degree of D.C. feedback. However, since the input impedance of the amplifier is imposed on C1 only when the amplifier is providing an output pulse as hereinbefore described, it is necessary to impose a similar impedance when the amplifier is off. This is afforded by field effect transistor Q3 which conducts when the amplifier is off each alternate half cycle. Thus a relatively constant resistance will be imposed on capacitor C1 thereby preventing a net charge accummulating across capacitor C1 due to ground fault signal action.

A normally open momentary push-buttom switch PB is connected in series with a resistor R12 across lines L1 and N. Resistor R12 is selected to have a value providing a current flow of approximately 15 milliamperes. Closure of switch PB will cause an artifically induced ground fault current to flow so that proper functioning of the interrupter can be checked and tested at any time.

Figure 3:
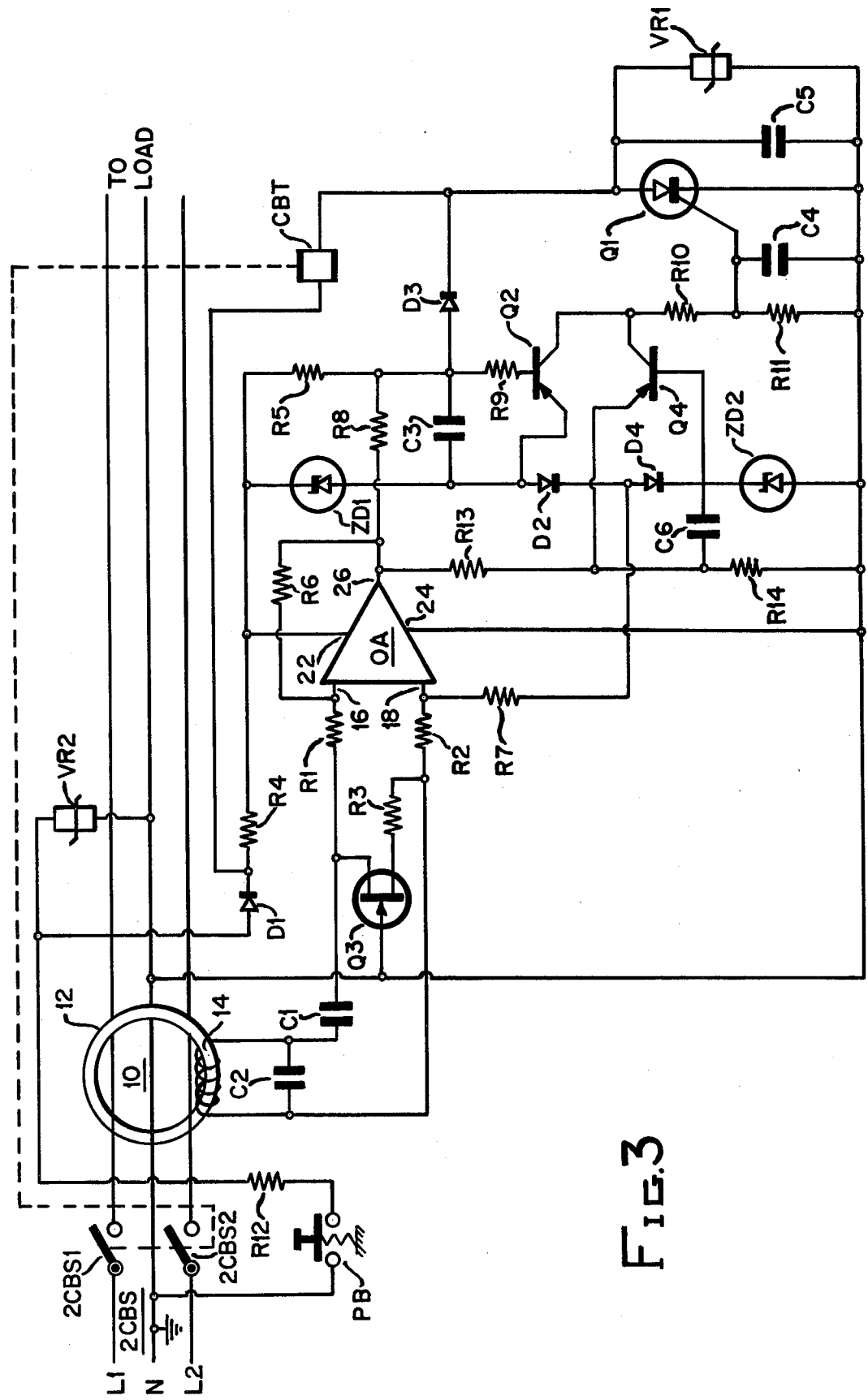
FIG. 3 is a diagramatic showing of a modified ground fault interrupter incorporating the invention as applied to a three wire load circuit.

FIG. 3 depicts a modified form of the interrupter as designed and applied to a single phase, three wire, grounded switch A.C distribution system. As shown a.c. conductor or wire designated N is grounded to earth, and the modified form of interrupter functions to open contacts 2CBS1 and 2CBS2 of the two pole circuit breaker 2CBS which are connected in conductors L1 and L2 whenever there is ground fault current from either of the latter two conductors to ground. The interrupter of FIG. 3 has many of the same components and circuit connections therebetween as previously described in connection with FIG. 1, and like components have been given the same reference numerals.

The interrupter of FIG. 3 additionally employs resistors R13 and R14 connected in series between the output terminal 26 of amplifier OA and ground return conductor 20. An additional diode D4 poled in the same direction is diode D2 is connected in circuit between diode D2 and zener diode ZD2 so that its anode is connected at a point common between resistor R7 and the cathode of diode D2. Also a capacitor C6 is connected from the point common between resistors R13 and R14 and the point common between diode D4 and zener diode ZD2. Also a second transistor Q4, like transistor Q2, is provided. The emitter of transistor Q4 is connected to the point common between resistors R13 and R14 and its collector is connected to the point common between the collector of Q2 and resistor R10. The base of transistor Q4 is connected to the point common between capacitor C6, diode D4 and zener diode ZD2.

The addition of resistors R13 and R14, capacitor C6, diode D4 and transistor Q4 renders amplifier OA effective to also provide an output pulse 180° out of phase with respect to those previously discussed in conjunction with the interrupter circuit on FIG. 1. Thus whenever a fault between L2 and ground occurs, transistor Q4 will be rendered conducting as before described for transistor Q2, and will, consequently, trigger SCR Q1 into conduction to energize solenoid CBT and cause opening of the contacts 2CBS1 and 2CBS2 of the circuit breaker.

When a fault occurs between L1 and ground, the circuit functions exactly the same as before described in conjunction with the interrupter of FIG. 1. FIGS. 4a to 4e shows the relationship between the amplifier OA output pulse for the no-ground fault and different types ground fault conditions that can occur between lines L1 and L2 and ground.

It will be appreciated that the operational amplifier QA of both the embodiments of FIGS. 1 and 3 functions as demiodulator as well as an amplifier. Thus it be understood that the demiodulation function could be provided before or after the amplification if desired. For example, in place of amplifier QA a ring demodulator followed by well known means of amplification could be used to produce the same results.

The inclusion of varistor VR2 in both embodiments has been found advantageous in markedly reducing nuisance operation of the ground fault interrupters due to high momentary transients that may be imposed on the power lines in which they may be connected. Such transients can cause arc-over from the electrified conductor L1 or L2 to structures connected to earth ground, and a ground fault current at line frequency can follow and cause operation of the ground fault interrupter. The varistor VR2 acts to absorb the energy in the transient line surges and thus prevents such arc-overs from occurring.

We claim:

1. Ground fault interrupter apparatus, exhibiting reduced sensitivity to capacitive ground faults and suitable for economical and compact fabrication, comprising:
    a differential current transformer having a magnetic core for association with primary windings that are conductors of an electrical system to be protected by the apparatus and also having a sensing element for sensing current unbalance between the primary windings;
    an amplifier having at least one input terminal connected with said sensing element, and
    bias supply means for supplying to said amplifier a bias potential that is periodically zero and comprising a rectifier for half wave rectifying AC line voltage and the half-wave rectified potential produced by said rectifier is supplied to said amplifier free of filtering.

2. Ground fault interrupter apparatus in accordance with claim 1 wherein:
    said amplifier has an output terminal, and;
    a solid state switch is provided having a control terminal connected with said output terminal of said amplifier.

3. The subject matter of claim 1 wherein: said means to supply an operating supply to said amplifier comprises an A.C. source and a diode rectifier; said thyristor is connected by said main terminals in series aiding direction with said diode rectifier.

4. Ground fault interrupter apparatus in accordance with claim 2 wherein:
    said solid state switch is in a circuit branch connected between conductors of an electrical system to be protected by the apparatus in series with said rectifier and with a solenoid trip coil of a circuit breaker to be tripped upon occurrence of a ground fault.

5. Ground fault interrupter apparatus in accordance with claim 4 wherein:
    said solid state switch has a rectifying characteristic and is in said circuit branch in series aiding direction with said rectifier.

6. In a ground fault interrupter for insertion between an alternating current supply circuit and an electrical load, said circuit having a neutral, electrically grounded conductor and at least one electrified conductor, the combination with a circuit breaker having contacts connected in circuit with each electrified conductor and having an electro-responsive trip open mechanism, and a differential transformer having primary windings connected in series with each of said conductors and having a secondary winding,
    (a) an operational amplifier having its two input terminals connected in circuit with said transformer secondary winding,
    (b) an integrating capacitor in circuit with the output terminal of said amplifier
    (c) a transistor having its base connected in circuit with the output of said amplifier and said integrating capacitor and being normally biased to cut-off when no ground fault signals are induced, or when reactive ground faults signals are induced in said transformer secondary winding, said transistor being rendered conducting whenever a resistive ground fault signal of a predetermined level is induced in said secondary winding
    (d) means in circuit with said alternating current supply and supplying half wave rectified D.C. bias to said operational amplifier and the base and emitter of said transistor, and
    (e) means responsive to conduction of said transistor to energize said electro-responsive contact trip open mechanism.

7. The combination according to claim 6 wherein said means responsive to conduction of said transistor comprises a semi-conductor controlled rectifier having its main conducting path connected in circuit with said electro-responsive contact trip open mechanism and its control electrode in circuit with the output side of said transistor.

8. The combination according to claim 6 wherein said means responsive to conduction of said transistor further comprises circuit means latching the base of said transistor to a reference voltage maintaining it conducting in response to conduction of said semi-conductor controlled rectifier.

9. A ground fault interrupter as defined in claim 6 together with a capacitor connected across said transformer secondary winding to tune out any inductive effects being superimposed on the signal input terminals of said amplifier, a second capacitor connected between one side of said transformer secondary winding and one input terminal of said amplifier, and a field effect transistor having its drain electrode connected to the point common between the last mentioned capacitor and the signal input terminal of said amplifier, its source electrode connected to the opposite side of said secondary winding and its gate electrode connected to said neutral conductor.

10. A ground fault interrupter as defined in claim 6 wherein there are two electrified conductors, wherein the differential transformer is provided with three primary windings connected in series with each of said electrified conductors and said neutral conductor, respectively, wherein said amplifier provides output pulses of opposite polarity each half cycle of the A.C. supply, and wherein a second transistor is provided which is biased by such output pulses on the opposite half cycle pulses from those biasing the first mentioned transistor and wherein the means responsive to conduction of said first mentioned transistor is also responsive to conduction of said second transistor to energize said electro-responsive contact trip-open means of said circuit breaker.

* * * * *